Aug. 22, 1961        C. S. TEREZ        2,997,186
LAMP TRANSFER MECHANISM
Filed Nov. 9, 1959        2 Sheets-Sheet 1
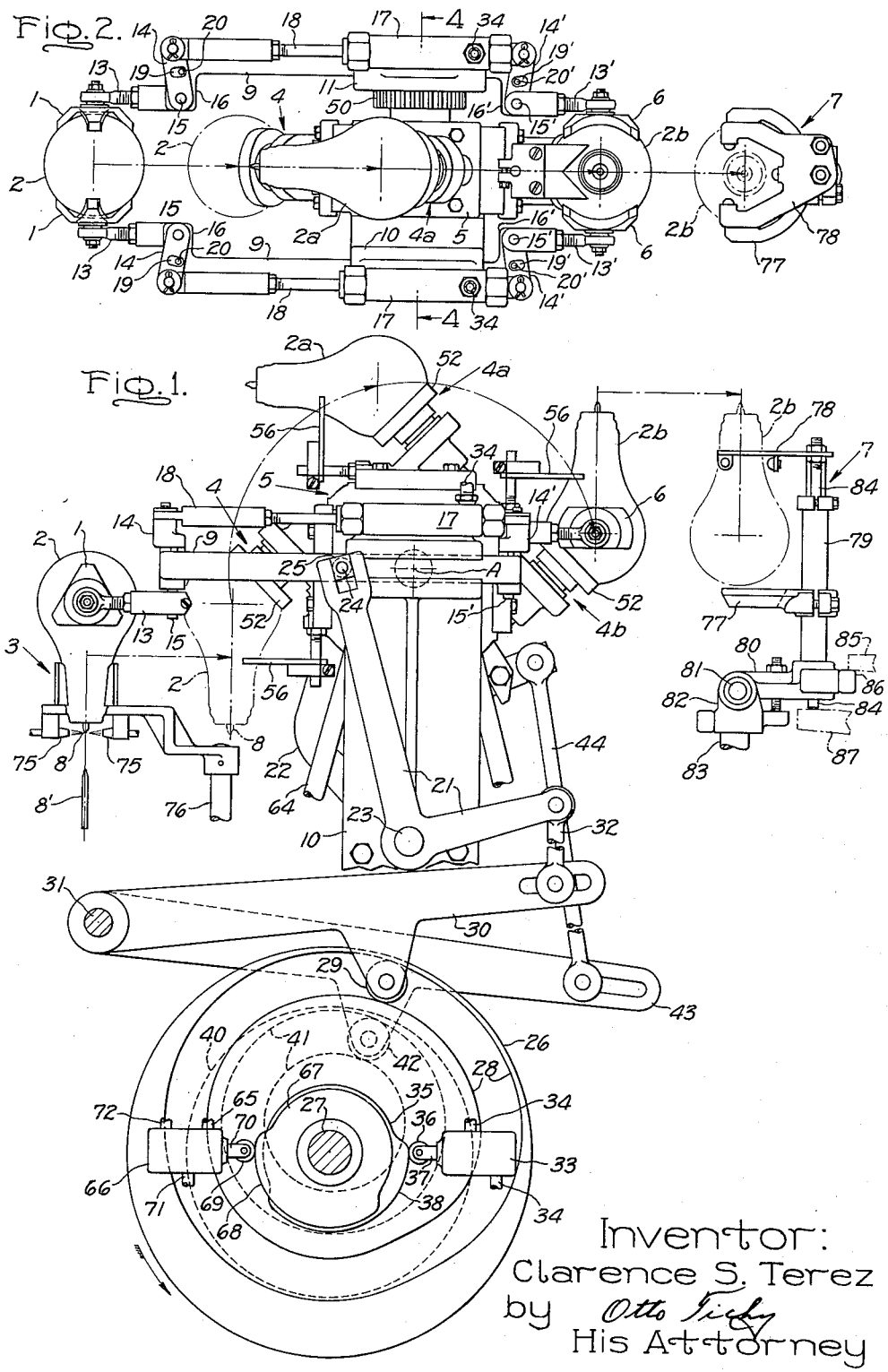
Inventor:
Clarence S. Terez
by Otto Tichy
His Attorney

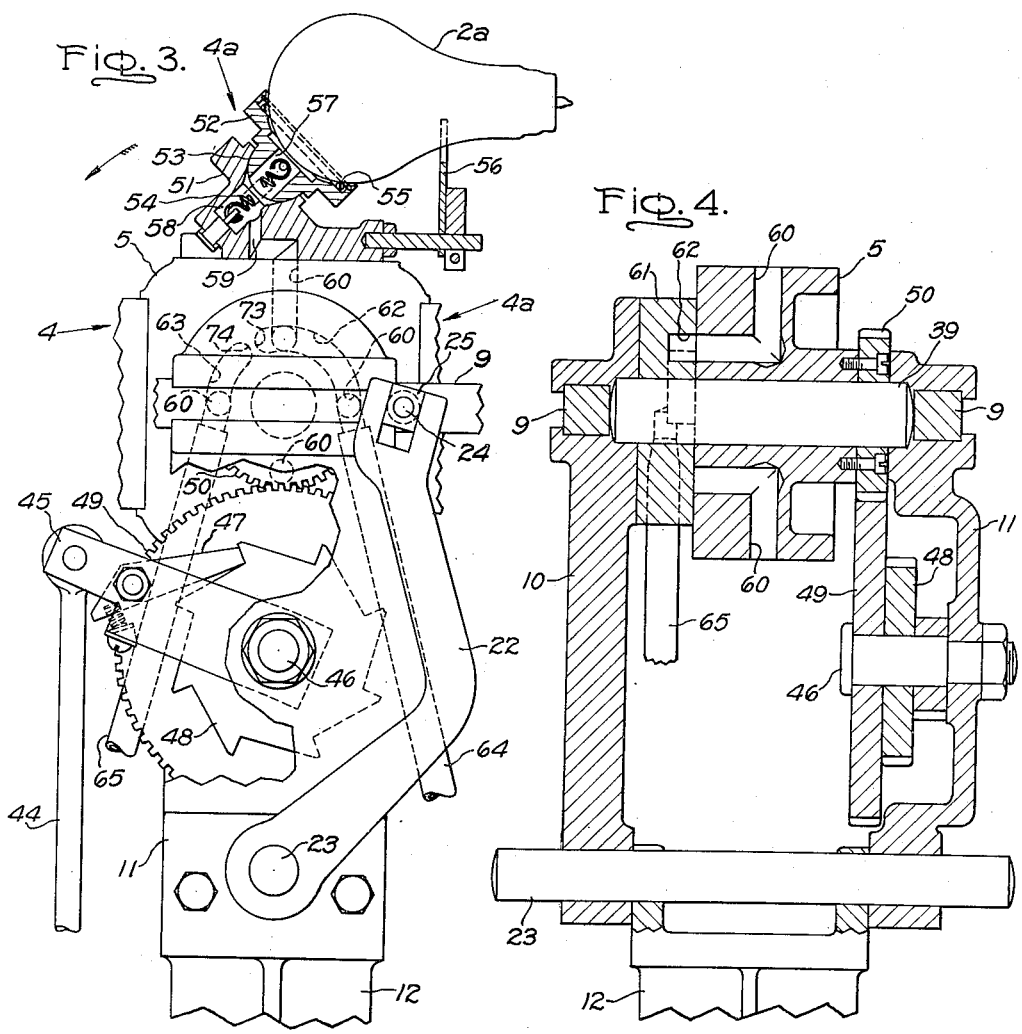

2,997,186
LAMP TRANSFER MECHANISM
Clarence S. Terez, Maple Heights, Ohio, assignor to General Electric Company, a corporation of New York
Filed Nov. 9, 1959, Ser. No. 851,871
2 Claims. (Cl. 214—1)

This invention relates generally to transfer mechanisms and more particularly to improved mechanism for transferring electric lamp bulbs from one assembly machine to another and for inverting the bulbs during the course of the transfer operation.

It is a principal object of the invention to provide improved mechanisms which will operate reliably at high speeds and with a minimum of maintenance.

Generally speaking, and in accordance with one aspect of the invention, the improved apparatus comprises a turret mounted for rotation on a horizontal axis and an associated transfer mechanism comprising pairs of jaws at opposite sides of the turret and arranged for simultaneous reciprocating movement and operation in a manner such that one pair of jaws transfers a bulb from a pick-up position to one side of the turret while another pair of jaws transfers a bulb from the other side of the turret to a delivery position.

Further features and advantages of the invention will appear from the following description of a species thereof and from the drawings wherein:

FIG. 1 is an elevation of apparatus comprising the invention;

FIG. 2 is a plan view thereof;

FIG. 3 is a fragmentary elevation, partly in section, and taken from the side opposite that shown in FIG. 1; and FIG. 4 is a fragmentary front elevation taken along the line 4—4 in FIG. 2.

Referring to the drawings, at the stage of operation shown in FIGS. 1 and 2, a pair of pick-up jaws 1 of the transfer mechanism has gripped a bulb 2 and is about to transfer it from a holder 3 in a sealing and exhaust (sealex) machine and carry it horizontally to the position shown by dot dash lines where it is gripped by a suction head or holder 4 on a vertical turret 5 while, at the same time, a pair of delivery jaws 6 has gripped a bulb 2b in a head 4b at the diametrically opposite side of the turret and is about to transfer it horizontally to the position shown in dot dash lines where it is gripped by a holder or head 7 on a basing or finishing machine. When the transfer jaws 1 and 6 are moved back to the position shown in FIGS. 1 and 2, the turret 5 is indexed (clockwise in FIG. 1) to carry the bulb 2 in head 4 to the position occupied by bulb 2a in head 4a, while the bulb 2a is carried to the position occupied by the bulb 2b in head 4b, and the head 4b moves to a position occupied by a fourth head (not shown) located opposite to and below the head 4a. The turret 5 thus receives a lamp bulb 2 having its exhaust tubulation 8 lowermost and inverts the bulb while also moving it closer to he head 7.

Referring more specifically to the structure of the apparatus, the pairs of transfer jaws 1 and 6 are mounted for reciprocating motion on a pair of horizontal slides 9 which are located at axially opposite sides of the turret 5 and are slidably mounted in ways at the upper ends of respective brackets 10 and 11 (FIG. 4) which are attached to a standard 12. Each of the jaws 1 is carried by respective lever arms 13 and 14 (FIG. 2) which are fixed to a pin 15 which pivots in a transverse end portion 16 of the respective slide 9. The jaws 6 are similarly mounted at the opposite ends of the slide 9 in arms and pins which correspond to and are numbered the same, except for the addition of a prime, as those associated with jaws 1.

The opening and closing motions of the pairs of jaws 1 and 6 are effected by two floating air cylinders 17 having their closed ends connected to respective lever arms 14' associated with the jaws 6 and having their piston rods 18 connected to respective lever arms 14 associated with the jaws 1. When air is supplied to the two cylinders 17 simultaneously, the piston rods 18 are pushed out, and their forward motion closes the jaws 1 by pivoting the lever arms 14, 13 associated therewith. The reaction at the closed ends of the cylinders 17 closes the jaws 6 by pivoting the lever arms 14', 13' associated therewith.

All four lever arms 14 and 14' are restricted in the extent of their travel by means of slots 19 therein (FIG. 2) which move over stationary pins 20 mounted on the slides 9. When the jaws 1 and 6 are opened, each pin 20 restricts the motion of its corresponding lever 14 or 14' to an amount sufficient only to permit the jaws to clear the bulbs 2 and 2b. When the jaws are closed on the bulb, as in FIG. 2, the pins 20 are not quite at the ends of the slots 19 in the opposite direction. If it should happen that one or more bulbs are missing, the levers 14 and 14' move until the pins 20 are in contact with the ends of the slots 19. Since there is so little movement of the slots 19 with reference to the pins 20 during the grasping or closing motion when no bulb is in place as compared to when a bulb is in place, there is no appreciable variation in the performance of grasping a bulb at one end of the transfer whether or not a bulb is present at the other end of the transfer.

The slides 9 carrying the jaws 1 and 6 are actuated in unison by a bell crank 21 and a bent lever 22 (FIGS. 1 and 3) which are located at opposite sides of the device and are fixed to a common shaft 23 which is journalled in the lower ends of the brackets 10 and 11. The respective slides 9 are connected to the crank 21 and lever 22 through a pin 24 attached to the slide and a block 25 which is fitted on the pin and is engaged by a yoke portion at the end of the respective crank 21 and lever 22. The slides 9 are reciprocated through crank 21 and lever 22 when the shaft 23 is oscillated by a cam 26 (FIG. 1) which is mounted on shaft 27 and has a track or groove 28 in its face which is engaged by a roller 29 on a follower arm 30 which is pivoted on a shaft 31 and is connected through a connecting rod 32 to the short arm of the bell crank 21.

The opening and closing of the jaws 1 and 6 at each end of the reciprocating motion of the slides 9 is properly correlated by the opening and closing of a valve 33 (FIG. 1) in the air line 34 to the cylinders 17 which are of the single acting, spring return type holding the jaws normally open. The said valve 33 is under the control of a cam 35 on the shaft 27 which engages a roller 36 on the stem 37 of the valve to open the valve and admit compressed air to the cylinders 17 to close the jaws 1 and 6 when the roller is in engagement with the high side or rise portion 38 of the cam 35.

Referring now to the turret 5, it is of generally square outline and carries four suction type heads or holders, three of which are shown at 4, 4a and 4b. The said turret is mounted for rotation on a horizontal shaft 39 (FIG. 4) which is journalled at the upper ends of the brackets 10 and 11, and it is indexed while the transfer assembly of jaws 1 and 6 and slides 9 is being moved from right to left in FIGS. 1 and 2. The indexing motion is derived from a cam 40 on shaft 27 and having in its face a track or groove 41. The said cam track 41 actuates, through roller 42, a follower lever 42 which is pivoted on shaft 31 and is connected to a connecting rod 44 which advances a ratchet arrangement ⅛ of a turn for each operating cycle of the transfer mechanism. The ratchet mechanism comprises a link 45 (FIG. 3) which is connected at one end to rod 44 and at its other end to a shaft or pin 46 (FIG. 4) journalled in the bracket 11. The link 45 carries a spring loaded pawl 47 (FIG. 3) which engages a ratchet wheel 48 which is mounted on said shaft 46 and is attached to a gear 49 which meshes with a gear 50 which is mounted on the shaft 39 and is fixed to the turret 5. The gears 49 and 50 are in a ratio of 2:1 to cause the turret 5 to be rotated ¼ of a revolution at each indexing motion.

Each of the suction holders 4, 4a, etc., comprises a body portion 51 (FIG. 3) which is mounted on the turret 5 and carries a cup portion 52 which is mounted thereon by a spherical ball joint 53 and is held in place by a spring 54. The cup portion 52 is provided at its mouth with a floating rubber ring seal 55. In the embodiment illustrated herein, the holders are so arranged that the mouth or rim of the cup portion 52 lies in a plane which is inclined at an angle of about 45°, and the center of said cup portion is displaced from a vertical or horizontal plane through the axis of the turret. More specifically, in the position shown in FIG. 1, the mouth of the cup portion 52 of holder 4 is at an angle of about 45° below the horizontal and the center of said mouth is below the horizontal plane through the axis A of the turret. Thereby, at the position shown by holder 4b, the mouth of the cup portion 52 is at an angle of 45° above the horizontal and its center is displaced above the horizontal plane through axis A. Thus, the lamp bulbs 2, 2a, etc., are inverted and, at the same time, they are raised a predetermined distance as measured from the center of the spherical end portions of the bulbs so that they are at the proper elevation for insertion into the head 7.

The holders 4, 4a, etc., each also includes a V-notched cradle support member 56 mounted on the body portion 51 for supplying supplemental support and guidance for the bulbs 2, 2a, etc.

The lamp bulbs are held in the cup portion 52 of each holder by vacuum supplied through a central passage 57 (FIG. 3) in the said cup portion and passages 58 and 59 in the body portion 51. The passage 59 has a restriction to limit the flow of air into the vacuum system when a lamp bulb is missing so that it will not permit a lamp held in another holder to fall off. The body of the turret 5 serves as the moving portion of a rotary valve and is provided with four right angle passages 60 (FIG. 4) leading to respective passages 59 in the holders 4, 4a, etc. The stationary portion 61 of the valve has long and short arcuate passages 62 and 63 therein (FIG. 3) arranged to communicate with the passages 60 in the turret 5. The longer passage 62 is connected continuously to vacuum through a conduit 64 whereas the shorter passage 63 is connected to vacuum periodically through a conduit 65, the vacuum connection being under the control of a valve 66 (FIG. 1) operated by a cam 67 on shaft 27.

In the operation of the device, as the holder 4 on turret 5 is indexed into the position shown in FIG. 1, in apposition to the bulb holder 3 on sealex machine, it is connected to vacuum by virtue of the fact that the end of the horizontal leg of the associated angular passage 60 is aligned with the lower end of the arcuate passage 62 in the stationary valve section 61. Then the pairs of jaws 1 and 6 are closed upon respective bulbs 2 and 2b by actuation of air cylinders 17 by valve 33 and cam 35, and then the vacuum to holder 4b through arcuate slot 63 is cut off by valve 66 which vents the conduit 65 to the atmosphere through vent 72. The slides 9 are then moved to the right in FIG. 1 to deliver lamp bulb 2 to holder 4, and to deliver bulb 2b to head 7. The jaws 1 and 6 are then opened by action of cam 35 and valve 33 to cut off air pressure to the cylinders 17, after which the said jaws are retracted back to the left in FIG. 1 by actuation of the slides 9 by the cam 26. During the retraction of slide 9 and jaws 1 and 6, the turret 5 is again indexed and suction is applied to conduit 65 and arcuate passage 63 so that, as the port 60 associated with holder 4a (FIG. 4) passes the end 73 of the larger passage 62, it immediately comes into connection with the adjacent end 74 of the shorter passage 63 to retain the suction in holder 4a while it is indexing into the position occupied by holder 4b (FIG. 1).

As illustrated herein, the holder 3 (FIG. 1) from which the lamp bulb 2 is transferred is part of a "tipping-off" mechanism associated with the exhaust turret of a sealex machine. At the tipping off station occupied by the holder 3, the lamp bulb 2 has been carried into the holder 3 by an exhaust head or port (not shown) in which the lamp is at that time supported by engagement of an extended portion 8' of its exhaust tube with the exhaust port. The tipping off operation is effected by fusing the glass exhaust tube 8, 8' at a point just below the end of the bulb 2 by means of burners 75 carried by the holder 3. Upon softening of the exhaust tube, the holder 3 is raised to the position shown in FIG. 1 by upward movement of its support rod 76 to thereby attenuate the heated zone of the tube and assist in severing and sealing it off. After the bulb 2 has been gripped by the jaws 1 of the transfer mechanism, the holder 3 is again lowered to receive the next bulb and to permit the bulb 2 to be transferred horizontally by the jaws 1 to the suction holder 4 on turret 5.

Also as illustrated herein, the head 7 into which the lamp bulbs are transferred is part of a basing and finishing machine in which the lamp 2b is completed by attachment of a base to its neck end which is at that time uppermost. The said head 7 is of the type disclosed and claimed in Patent 2,910,166, Wiltshire et al., which is assigned to the same assignee as the present case, and to which reference may be had for a more complete description. Briefly stated, the head 7 comprises a pair of spaced clamping members in the form of a cup-shaped holder 77 and a yoke-shaped holder 78 shown in FIG. 1 in position to receive the lamp bulb 2b. The cup holder 77 is attached to a vertical hollow post 79 which is mounted on one end of a lever 80 which is pivotally mounted on a pin 81 in a bracket 82 carried by a spring loaded spindle 83. The yoke-holder 78 is carried by a spring loaded rod 84 which is slidable in the bore of the post 79 and is normally urged downward relative to the post 79. In the loading position shown in FIG. 1, the assembly of holder 77, post 79 and spindle 83 is held down by a lever 85 engaging a roller 86 on the lever 80, whereas the yoke holder 78 is held in an upper position by a lever 87 engaging the rod 84. Upon entry of the bulb 2b into the position shown in dot dash lines in FIG. 1, the cup holder 77 is raised and the yoke holder 78 is lowered relative thereto to clamp the bulb therebetween as the lever 85 is raised to permit upward movement of the spring loaded spindle 83 and the lever 87 is lowered to permit downward movement of the spring loaded rod 84 in the post 79.

The combination, with the turret 5, of reciprocating jaws 1 and 6 mounted on slides 9 straddling the turret and also carrying the air cylinders 17 for effecting the closing and opening of the jaws 1 and 6, provides a rugged construction wherein the lamps are turned over during the course of a transferring operation over a relatively long span in a series of short steps which are performed rapidly, smoothly and with a high degree of precision.

What I claim as new and desire to secure by Letters Patent of the United States is:

1. In a lamp bulb turnover and transfer mechanism the combination of a turret pivoted on a horizontal axis for rotation in a vertical plane, means for indexing said turret about said axis, a plurality of holders carried a the periphery of said turret, a pair of slide member mounted at axially opposite sides of said turret for re ciprocation radially of the turret, pairs of pick-up and delivery jaws mounted at respective ends of said slide members to be at diametrically opposite sides of said turret, means for reciprocating said slides in unison to simultaneously move said pairs of jaws radially of the turret toward and away from holders temporarily located at said diametrically opposite sides of the turret, actuating means for simultaneously opening and closing said pairs of jaws comprising air cylinders mounted on said slide members and including an air supply line to said cylinders and cam actuated valve means in said lines operable to open and close said pairs of jaws in proper synchronism with the movement of said slide members, and means for effecting operation of said jaws in synchronism with the indexing of said turret to effect a cycle of operation wherein said pick-up jaws close upon a lamp bulb located at a pick-up position adjacent one side of the turret and said delivery jaws simultaneously close upon another lamp bulb held in a turret holder at the diametrically opposite side of said turret, said pick-up jaws are moved radially toward said turret to carry the bulb held thereby to a holder on said turret and said delivery jaws are simultaneously moved radially away from the turret to carry the bulb held thereby to a delivery position, both said pairs of jaws are opened and then retracted by reverse movement of said slides and said turret is indexed.

2. In a lamp bulb turnover and transfer mechanism, the combination of a turret pivoted on a horizontal axis for rotation in a vertical plane, means for indexing said turret about said axis, a plurality of holders carried at the periphery of said turret, a pair of slides mounted at axially opposite sides of said turret for reciprocation radially of the turret, pairs of pick-up and delivery jaws mounted on respective ends of said slides at diametrically opposite sides of said turret, one jaw of each said pairs of jaws being mounted on a given one of said slides, jaw actuating means comprising an air cylinder carried by each said slide and connected at opposite ends to the pick-up jaw and delivery jaw carried by the associated said slide, means to effect simultaneous opening and closing of said pairs of jaws including means to supply compressed air to said cylinders, means for actuating said slides in unison to carry said pairs of jaws radially of the turret toward and away from holders temporarily located at said diametrically opposite sides of the turret, and means for effecting operation of said jaws in synchronism with the indexing of said turret to effect a cycle of operation wherein said pick-up jaws close upon a lamp bulb located at a pick-up position adjacent one side of the turret and said delivery jaws simultaneously close upon another lamp bulb held in a turret holder at the diametrically opposite side of said turret, said pick-up jaws are moved radially toward said turret to carry the bulb held thereby to a holder on said turret and said delivery jaws are simultaneously moved radially away from the turret to carry the bulb held thereby to a delivery position, both said pairs of jaws are opened and then retracted and said turret is indexed.

References Cited in the file of this patent

UNITED STATES PATENTS

| | | |
|---|---|---|
| 609,472 | Smyser | Aug. 23, 1898 |
| 1,933,225 | Smith | Oct. 31, 1933 |
| 2,307,517 | Langer | Jan. 5, 1943 |
| 2,791,316 | Mullan et al. | May 7, 1957 |
| 2,823,809 | May | Feb. 18, 1958 |
| 2,904,192 | Reynolds et al. | Sept. 15, 1959 |